United States Patent
Groseclose, Jr. et al.

(10) Patent No.: US 7,917,807 B2
(45) Date of Patent: Mar. 29, 2011

(54) POWER SYSTEM COMMUNICATION MANAGEMENT AND RECOVERY

(75) Inventors: Michael Robert Groseclose, Jr., Tucson, AZ (US); David Montgomery, Tucson, AZ (US); Todd Charles Sorenson, Tuson, AZ (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 12/354,736

(22) Filed: Jan. 15, 2009

(65) Prior Publication Data

US 2010/0180144 A1 Jul. 15, 2010

(51) Int. Cl.
*G06F 11/00* (2006.01)
(52) U.S. Cl. .......................................... 714/22
(58) Field of Classification Search .................. 714/22
See application file for complete search history.

(56) References Cited

U.S. PATENT DOCUMENTS

| | | | |
|---|---|---|---|
| 6,008,971 A * | 12/1999 | Duba et al. | 361/64 |
| 6,437,804 B1 | 8/2002 | Ibe et al. | |
| 6,587,844 B1 | 7/2003 | Mohri et al. | |
| 7,002,925 B2 | 2/2006 | Richardson | |
| 7,340,620 B2 * | 3/2008 | Dove | 713/300 |
| 7,830,815 B1 * | 11/2010 | Koren et al. | 370/252 |
| 2002/0027887 A1 * | 3/2002 | Moriya | 370/256 |
| 2007/0067845 A1 | 3/2007 | Wiemer et al. | |
| 2009/0150590 A1 * | 6/2009 | Dickson | 710/303 |
| 2009/0282292 A1 * | 11/2009 | Squire | 714/39 |
| 2010/0114475 A1 * | 5/2010 | Shin et al. | 701/201 |
| 2010/0121585 A1 * | 5/2010 | Wang et al. | 702/59 |
| 2010/0246485 A1 * | 9/2010 | Potkonjak | 370/328 |

OTHER PUBLICATIONS

Düdar P., Aytaç A. (Turkey): On the neighbour vulnerability of recursive graphs, Neural Network World, vol. I. 16, No. 1, p. 5-14, Jan. 2006. published in Czech Republic.

* cited by examiner

*Primary Examiner* — Bryce P Bonzo
(74) *Attorney, Agent, or Firm* — Griffiths & Seaton PLLC

(57) ABSTRACT

A method, system, and computer program product for determining severity of communication deficiencies and isolating faults in a power network of a data processing environment is provided. Pursuant to a continuous graph theory analysis, each of a plurality of nodes of the power network is initialized with the same arbitrary value. Each of a plurality of network paths connecting each of the plurality of nodes is analyzed. Upon a successful communication or communication deficiency over one of the plurality of network paths, one arbitrary value of one of the plurality of nodes connected to the one of the plurality of network paths is incremented or decremented, respectively by a weighting value. The incrementing and decrementing is repeated until a threshold is reached and a recovery is performed on which of the plurality of nodes has a lower adjusted value.

20 Claims, 7 Drawing Sheets

POWER SYSTEM COMMUNICATION MANAGEMENT AND RECOVERY

BACKGROUND OF THE INVENTION

1. Field of the Invention

The present invention relates in general to computers, and more particularly to a method, system, and computer program product for determining severity of communication deficiencies, isolating faults, and mapped recovery in a power network of a data processing environment by a processor device connected to a memory device pursuant to continuous graph theory analysis.

2. Description of the Related Art

Data storage devices such as disks are commonplace in today's society. Devices such as controllers control access to the storage devices in response to read and write requests. The storage controllers also mirror data to different storage devices and spread data amongst different storage devices for redundancy and backup purposes. Storage controllers may store data in accordance with one of several redundant array of independent disk (RAID) security levels. Generally, the higher the RAID level the greater the redundancy of the data storage. Pooled storage devices may be used to increase storage capacity and provide recovery and backup services.

Data storage servers, such as an IBM Enterprise Storage Server (ESS), are also becoming commonplace. An IBM® ESS storage server includes two clusters of processors and associated hardware. Typically, there are four storage controllers in each cluster. Each of the storage controllers controls multiple storage devices grouped in RAID arrays. In one environment, clients with Fiber Channel Host Bus Adapters (HBA) are coupled via a Fiber Channel to a switch. The switch is also coupled to the Storage Server with Fiber Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

A known IBM® Enterprise Storage Server comprises two clusters of storage controllers with four storage controllers per cluster. Each cluster has its own cache (semiconductor) memory shared by all storage controllers in the cluster. Each cluster also has battery backed up nonvolatile storage ("NVS") which is shared by all of the storage controllers in the cluster, although any one storage controller cannot use more than 25 percent of the total NVS allocated to the cluster. In addition, each storage controller has its own cache (disk) storage. The cache memory is used for rapid access to data inpaged from external storage to service read data access requests from memory and to provide buffering of modified data. All update requests are written to the associated cluster and backed up by the NVS on the mirrored cluster.

Storage systems such as ESS use a variety of components to supply power to the storage clusters. These components are connected together in a power network over a power fabric. The various components, such as power adapters, act as nodes in the power system, while the power fabric acts as network paths to direct power appropriately.

SUMMARY OF THE INVENTION

It is desirable in storage systems to ensure that each of the various subcomponents is supplied power on a continual and efficient basis. If a power network suffers from a power communication deficiency (either due to a power component or power fabric deficiency), rapid identification and isolation of the problem along with effective recovery mechanisms are desirable in order to avoid possible data loss, excessive power consumption, or other disadvantages.

Mechanisms are currently in place to identify communication deficiency, determine the severity of the deficiency, and perform recoveries on the various subcomponents. These mechanisms may incorporate certain time-window and thresholding algorithms to perform this functionality. In many circumstances, however, the mechanisms may cause unnecessary loss of redundancy by failing to detect partial functionality in communication between subcomponents. In other words, a success-to-failure ratio over a period of time is not recognized by these mechanisms. In addition, current mechanisms may fail to isolate portions of the power fabric (such as power cables), and instead incorrectly designate a subcomponent incident to the fabric itself as failing or deficient.

In light of the above, a need exists for a mechanism to more effectively isolate power deficiencies, determine the severity of those deficiencies, and implement recoveries without the possible drawbacks described above.

Accordingly, in one embodiment, by way of example only, a method for determining severity of communication deficiencies, isolating faults, and mapped recovery in a power network of a data processing environment by a processor device connected to a memory device is provided. Pursuant to a continuous graph theory analysis, each of a plurality of nodes of the power network is initialized with an equal, arbitrary value. Also pursuant to the continuous graph theory analysis, each of a plurality of network paths connecting each of the plurality of nodes is analyzed. Upon a successful communication over one of the plurality of network paths, one arbitrary value of one of the plurality of nodes connected to the one of the plurality of network paths is incremented by a weighting value of a plurality of weighting values. The weighting value is representative of a physical characteristic (such as resistance or friction) of the one of the plurality of network paths. Upon a communication deficiency over the one of the plurality of network paths, the one arbitrary value of the one of the plurality of nodes connected to the one of the plurality of network paths is decremented by the weighting value. At least one of the incrementing and decrementing on an adjusted value is repeated for the one of the plurality of nodes obtained from application of the weighting value until a predetermined threshold for the one of the plurality of network paths is reached. Upon reaching the predetermined threshold, a recovery on which of the plurality of nodes connected to the one of the plurality of network paths having a lower adjusted value is performed. In case of a tie, recovery is delegated by the network path having reached threshold.

In an additional embodiment, again by way of example only, a system for determining severity of communication deficiencies, isolating faults, and mapped recovery in a power network of a data processing environment is provided. A power processor device is connected to a memory device. The power processor device is adapted for, pursuant to continuous graph theory analysis, initializing each of a plurality of nodes of the power network with an equal, arbitrary value, and analyzing each of a plurality of network paths connecting each of the plurality of nodes. Upon a successful communication over one of the plurality of network paths, one arbitrary value of one of the plurality of nodes connected to the one of the plurality of network paths is incremented by a weighting value of a plurality of weighting values. The weighting value is representative of a physical characteristic (such as resistance or friction) of the one of the plurality of network paths. Upon a communication deficiency over the one of the plurality of network paths, the one arbitrary value of the one of the plurality of nodes connected to the one of the plurality of network paths is decremented by the weighting value. At least one of the incrementing and decrementing on an adjusted value is repeated for the one of the plurality of nodes obtained from application of the weighting value until a predetermined threshold for the one of the plurality of network paths is reached. Upon reaching the predetermined threshold, a recovery on which of the plurality of nodes connected to the one of the plurality of network paths having a lower adjusted value is performed. Again, in case of a tie, recovery is delegated by the network path having reached threshold.

In still another embodiment, again by way of example only, a computer program product for determining severity of communication deficiencies, isolating faults, and mapped recovery in a power network of a data processing environment by a processor device connected to a memory device is provided. The computer program product comprises a computer-readable storage medium having computer-readable program code portions stored therein. The computer-readable program code portions comprise a first executable portion for, pursuant to continuous graph theory analysis, initializing each of a plurality of nodes of the power network with an equal, arbitrary value, and a second executable portion for analyzing each of a plurality of network paths connecting each of the plurality of nodes. Upon a successful communication over one of the plurality of network paths, one arbitrary value of one of the plurality of nodes connected to the one of the plurality of network paths is incremented by a weighting value of a plurality of weighting values. The weighting value is representative of a physical characteristic (such as resistance or friction) of the one of the plurality of network paths. Upon a communication deficiency over the one of the plurality of network paths, the one arbitrary value of the one of the plurality of nodes connected to the one of the plurality of network paths is decremented by the weighting value. At least one of the incrementing and decrementing on an adjusted value is repeated for the one of the plurality of nodes obtained from application of the weighting value until a predetermined threshold for the one of the plurality of network paths is reached. Upon reaching the predetermined threshold, a recovery on which of the plurality of nodes connected to the one of the plurality of network paths having a lower adjusted value is performed. Again, in case of a tie, recovery is delegated by the network path having reached threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
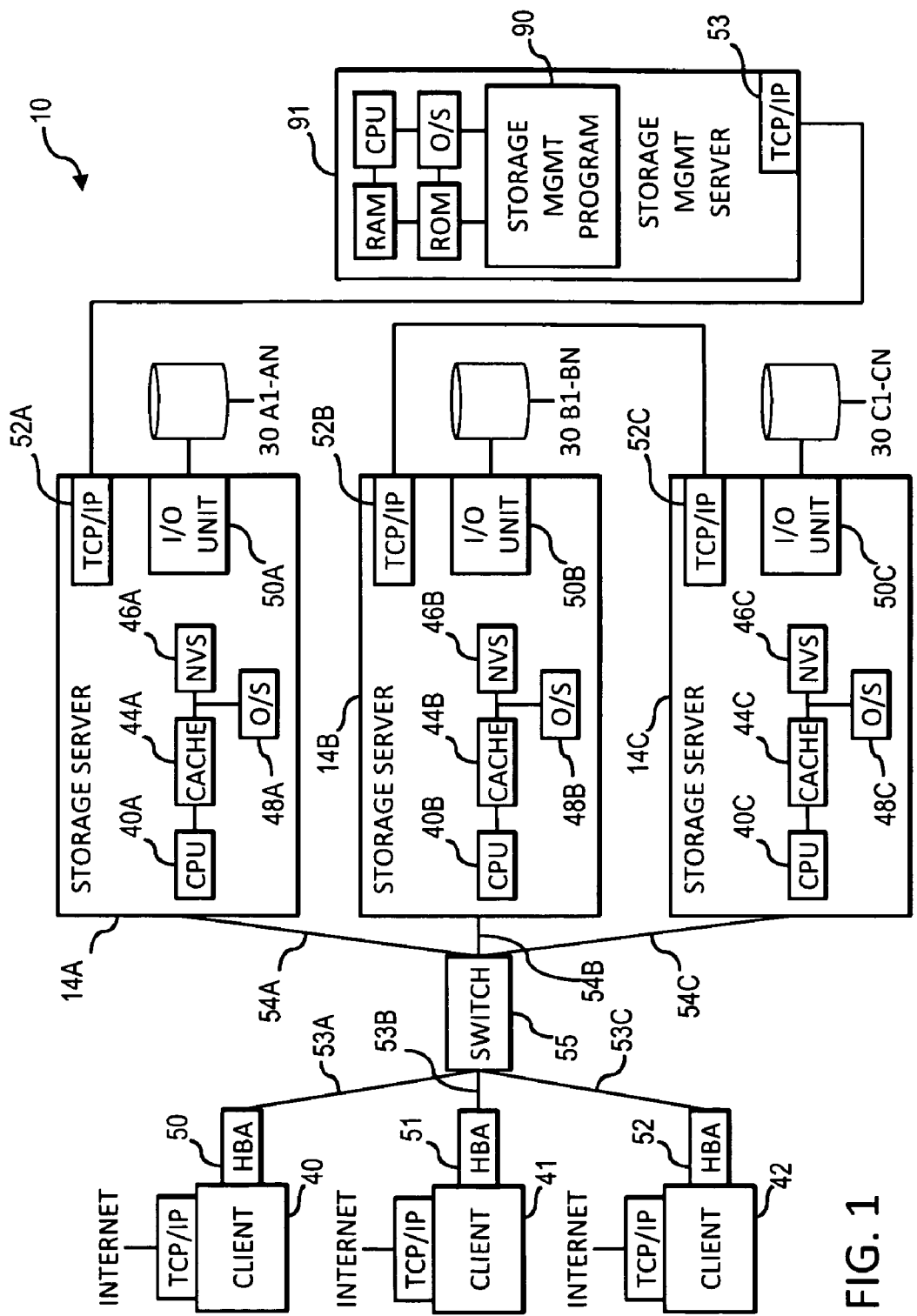
FIG. 1 is a block diagram of an exemplary distributed computer system including storage servers and a storage management server, in which aspects of the following description and claimed subject matter may be implemented.

The illustrated embodiments below provide improved mechanisms for determining severity of communication deficiencies, isolating faults, and mapped recovery in a power network of a data processing environment. With the implementation of the illustrated embodiments, single-point cable failures may be identified and designated so that incident adapters (nodes on the power network paths) no longer attempt to communicate on that particular network path. In these cases, if another path to an adapter exists, isolation of the adapter may be prevented. This may greatly increase the reliability of the power system over current solutions.

As the current solutions define different thresholds for different components, comparison of communication success between components may be unreliable. The illustrated embodiments utilize continuous graph theory analysis as an improvement over current methods of windowing and thresholding by normalizing the power system graph. Additional advantages of the illustrated embodiments include (1) recognition of partial or intermittent failures, (2) additional robustness and defined analysis and recovery, (3) improved and more accurate fault isolation, and (4), increased availability of components (such as power system adapters) and reliability of the power system as a whole.

In addition to considering the health of nodes in the power network, such as the aforementioned power adapters, the illustrated embodiments take into consideration the health of the power fabric itself, such as power cables, by thresholding against the cable. Upon reaching a threshold for a communication cable, the recovery is then delegated by the appropriate recovery-handler associated with the failing cable. Depending upon which adapter is in poorer health, that adapter's recovery-handler will be called with the failing cable to perform a unique recovery. Adapter recoveries may be stacked so that when a recovery is attempted, that recovery is removed from the stack so that it is not attempted again (as it did not work). Adapters can also be rewarded for defined periods of good communication health by adding or pushing recoveries back on the stack during runtime.

The mechanisms of the illustrated embodiments treat a power system as a dynamically changing, weighted graph based on physical properties. For example, in one embodiment, power cables may be measured in terms of resistance or cost (ohms), and adapters are measured in value or functionality (also units ohms). Each successful communication from an adapter to an adjacent adapter with respect to a cable results in increased value or rewarding of the adjacent adapter, and decreased resistance of the cable (minimum value=1). When a failure occurs between two adapters incident to a cable, the adjacent adapter is devalued by the current resistance (ohms) of the cable. Subsequent to this devaluation, the cable resistance itself may increment. What results is a dynamically changing representation (graph) that depicts troubled cables with higher resistance, and troubled adapters with lesser value. Using defined handlers that compare cable and adapter health (cost and value), and given the dynamic state of the graph, recovery is well defined.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. As the skilled artisan will anticipate, many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers 14a,b,c with respective central processing units (CPUs) 40a,b,c, cache 44a,b,c, nonvolatile storage ("NVS") 46a,b,c, operating system 48a,b,c, I/O unit 50a,b,c, and TCP/IP adapter card 52a,b,c. Each of the storage servers 14a,b,c manages storage allocation and access to multiple storage devices (such as disks) 30a1-an, 30b1-bn, and 30c1-cn, respectively, by clients 40, 41 and 42.

Clients 40, 41 and 42 have adapter cards 50, 51 and 52, such as a Fibre Channel adapter cards, for connection via a communication path 53a,b,c, such as a Fibre Channel, to a switch 55. Switch 55 can be coupled to storage servers 14a, b,c via host busses 54a,b,c, and can forward a request from any of the clients 40, 41 or 42 to any of the storage servers 14a,b,c as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
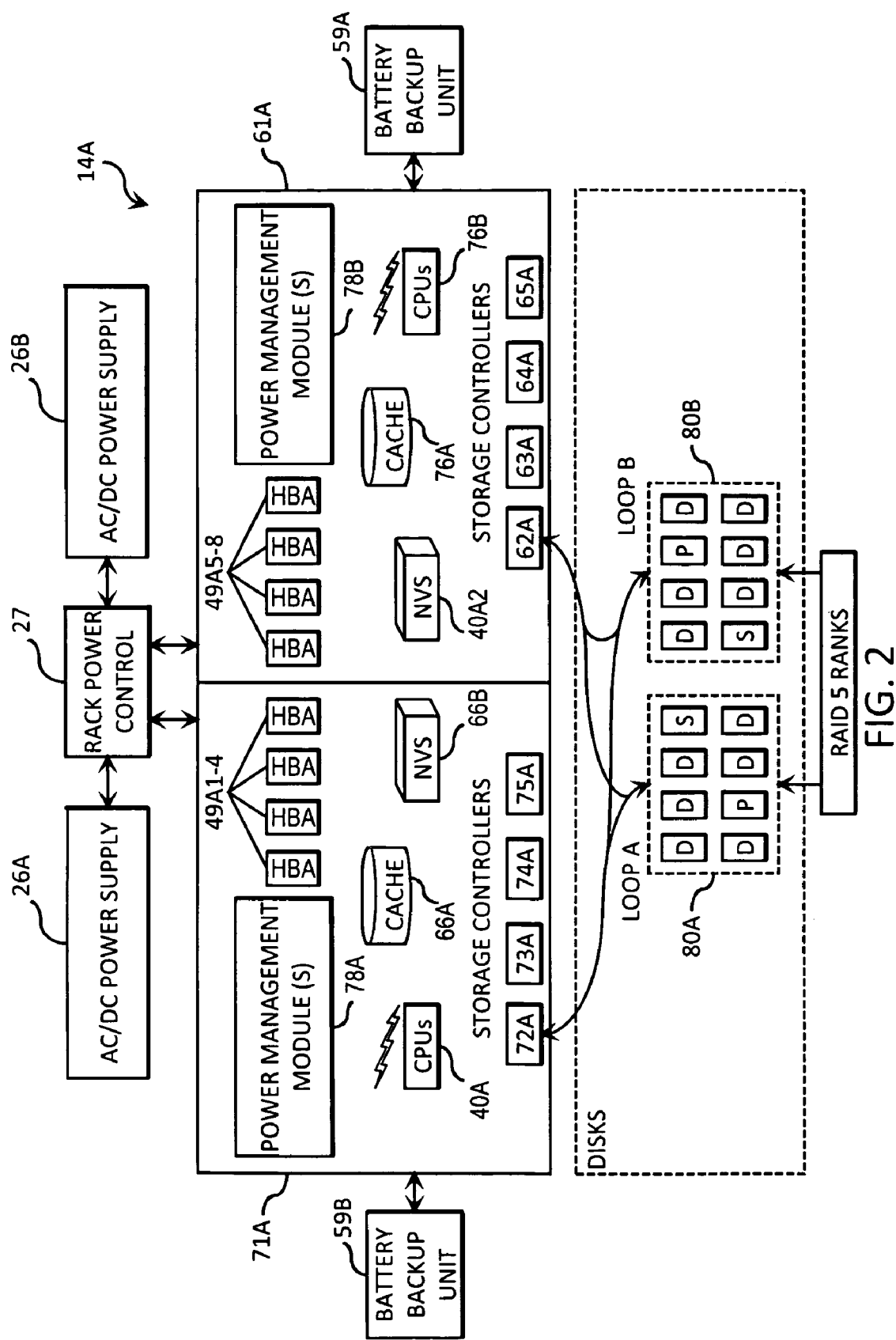
FIG. 2 is a block diagram of one of the storage servers of FIG. 1 including various nodes in a power distribution network.

In the exemplary embodiment illustrated in FIG. 2, storage server 14a (and likewise storage servers 14b and c) includes two identical clusters 61a and 71a of CPUs, Cache, NVS, and storage controllers, with four storage respective controllers 62a-65a and 72a-75a per cluster. There is a shared cache (semiconductor) memory 66a and 76a for each cluster 61a and 71a, respectively. Each cluster also contains battery backed-up storage 66b and 76b (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

Clusters 61a and 71a also may be referred to herein as central electronics complexes (CECs), as each of the clusters 61a and 71a contains electronics subcomponents responsible for carrying out and managing data storage. Clusters/CECs 61a and 71a act as nodes in a power distribution network connecting the CECs 61a and 71a with other power distribution components (additional nodes) as will be further described. This power distribution network may be represented and analyzed in graph form, also to be described, following.

When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14a,b,c via a SAN network. Alternately, there can be a separate instance of module 90 executing on each storage server 14a,b,c and communicating with the other instances of program 90 on the other storage servers via a TCP/IP network. The skilled artisan will appreciate that a variety of implementations of SMP module in communication with the overall storage subsystem are contemplated.

Referring again to FIG. 2, two alternating current/direct current (AC/DC) power supply units 26a and 26b are shown connected to a rack power control (RPC) module 27. RPC module 27 controls power sequencing for the storage server 14a. Power supply units 26a and 26b are additional nodes in the overall power distribution network as previously indicated. The power supply units 26a and 26b may be connected to the RPC module 27 over power cables (represented as shown by connecting arrows). While RPC module 27 is shown as a single logical entity, RPC module 27 may be logically or physically separated into two nodes in similar fashion to power supply units 26a and 26b. Power supply units 26a and 26b may also be referred to as primary power supplies (PPS) 26a and 26b. The RPC module 27 is, in turn, connected to CECs 61a and 71a.

Again, additional power cables may connect the RPC module 27 with the CEC 14a. In the depicted embodiment, one power cable from RPC 27 is connected to cluster 71a, while an additional cable is connected to cluster 61a. Power supplies 26a and 26b are connected through RPC 27 to each of power management module 78a (resident or operational on cluster 71a) and power management module 78b (resident or operational on cluster 61a). The functionality of power supplies 26a and 26b in conjunction with power management modules 78a and 78b will be further described, following.

Power management modules 78a and 78b may be adapted for monitoring the battery capacity of the battery backup units (BBUs) 59a and 59b connected to cluster 71a and 61a, and associated with NVS 66b and 76b. For example, as previously described, when a power instability and/or power failure is determined, the power management modules 78a and 78b may determine the remaining battery life in view of necessary destaging activity occurring from the NVS 66b and 76b to disk. BBUs 59a and 59b form additional nodes in the power supply/power distribution network as shown. BBUs 59a and 59b, RPC 27, PPSs 26a and 26b, and CEC 61a and 71a each contain various power distribution components that may collectively be referred to herein as adapters.

Figure 3:
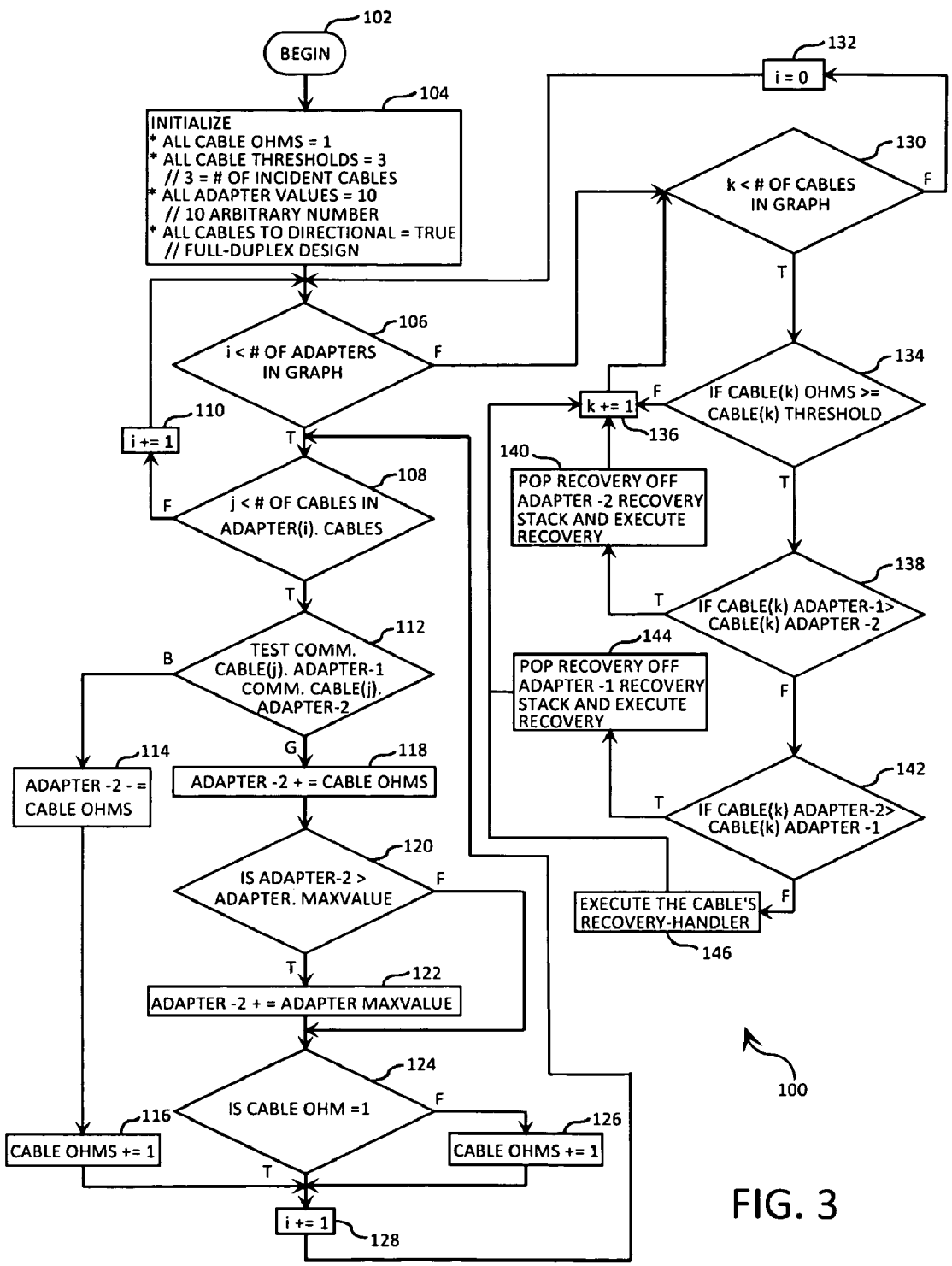
FIG. 3 is an exemplary method for determining severity of communication deficiencies, isolating faults, and mapped recovery in a power network of a data processing environment by a processor device connected to a memory device.

FIG. 3, following, illustrates an exemplary method 100 for determining severity of communication deficiencies, isolating faults, and mapped recovery in a power network of a data processing environment (such as that shown in FIGS. 1 and 2) by a processor device connected to a memory device. As one skilled in the art will appreciate, various steps in the method 100 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) with an initialization step (step 104) in which, pursuant to continuous graph theory analysis, all nodes in the power network (e.g., adapters) are initialized with an arbitrary value often (10). In addition, the power network paths (e.g., power cables) are initialized with a value representative of a physical characteristic of the network paths (ohms in the depicted embodiment). In the instant embodiment, full-duplex communication is assumed; however the method 100 is additionally applicable in half-duplex implementations.

Following the initialization of nodes and network paths (in the graph representation) as described, an ith (step 110) and jth (step 128) iteration is made through each of the adapters in the graph (step 106) and for each of the power cables incident to each of the adapters in the graph (step 108) for the following further analysis. Each adapter and cable is analyzed according to the following methodology (as step 110 iterates through an additional cable in the graph, and step 128 iterates through an additional adapter). If an adapter and/or incident cable remain to be analyzed (true for steps 106 and 108), the communication a particular cable is tested from a first adapter in the network to a second adapter in the network (adapter 1 to adapter 2) (step 112). If a communication deficiency is identified, then the arbitrary value of the second adapter is decremented (discounted in value) (step 114) by a weighting value representative of a physical characteristic of the power network (resistance/ohms in the depicted embodiment), and the weighting value is incremented (step 116).

If the communication is good, then the second adapter is rewarded with additional value (step 118) up to a maximum value (10 in the depicted embodiment). If the second adapter's value exceeds the maximum value (step 120), then the adapter's value is reset to the maximum value (step 122). If the weighting value (ohms) is equal to one (1) (step 124), then the jth iteration continues (again, step 128). If the weighting value is not equal to one (again, step 124), then the weighting value is first decremented by one (1) (step 126).

Once each of the cables/adapters in the graph are analyzed according to steps 106-128, control the moves to step 130, where an additional kth iteration is made for each of the cables in the graph. Each of the cables is examined to determine if a predetermined threshold has been reached or exceeded (step 134). If yes, control moves to step 138, where the first and second adapters connected to an effected cable are analyzed to determine which has a lower adjusted value (step 138). The adjusted value is obtained from the ith and jth iterations (steps 110, 128) discussed previously, where each adapter's values are incremented/decremented according to the incrementing/decrementing weighting value.

If the second adapter has the lower adjusted value (step 138), then the respective recovery at the top of the recovery stack for the second adapter is executed (step 140), and the kth iteration continues (step 136). If the first adapter has the lower adjusted value (step 142), then the respective recovery at the top of the recovery stack for the first adapter is executed (step 144), and the kth iteration continues (again, step 136). If both adapters are found to have the same adjusted value (indicating a cable failure), then the cable's recovery handler is executed (step 146).

Once each of the k iterations have taken place, then i is reset to zero (resetting the ith iteration and resetting the analysis), and the method 100 returns to step 106 where the initial analysis continues. As a result, the method 100 continually analyzes/recovers adapters and incident cables in the power distribution network.

Figure 4C:
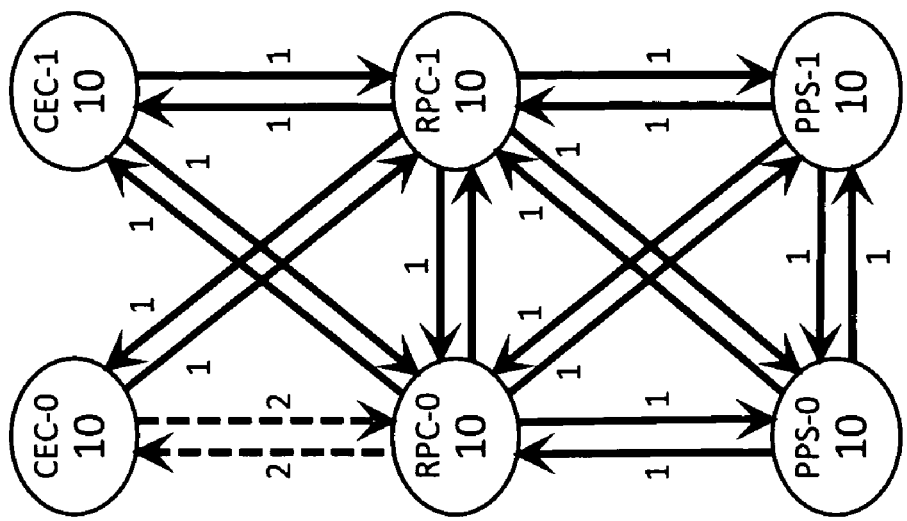
FIG. 4C illustrates a third step in the exemplary single-point power cable failure between adapters shown in FIG. 4A.
Figure 4B:
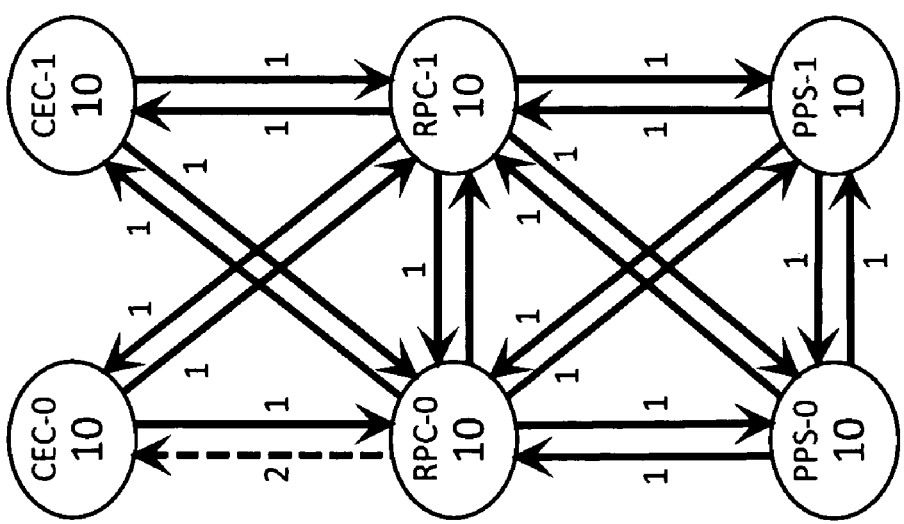
FIG. 4B illustrates a second step in the exemplary single-point power cable failure between adapters shown in FIG. 4A.
Figure 4A:
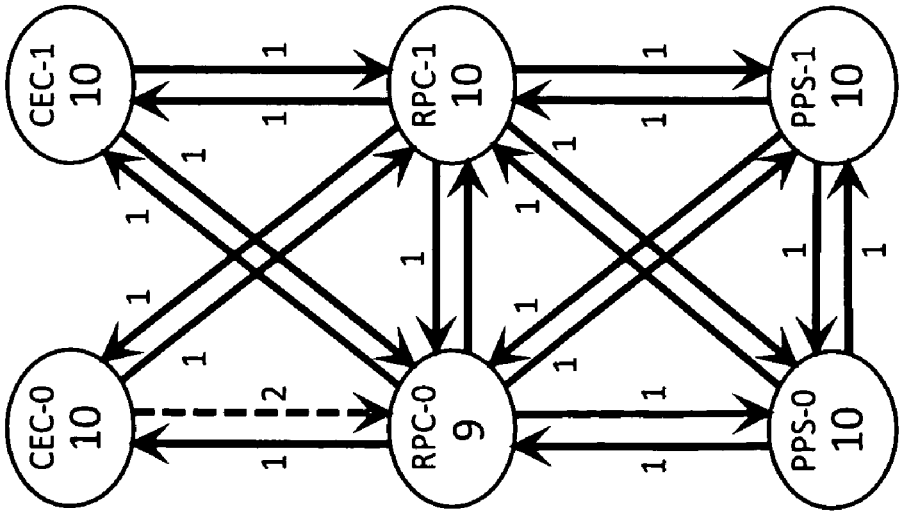
FIG. 4A illustrates a first step in an exemplary single-point power cable failure between adapters in a power network.

Turning now to FIG. 4A, a first step in an exemplary single-point cable failure is illustrated where method 100 (FIG. 3) is applied. FIG. 4A depicts a graphical representation of a power distribution network of the various nodes discussed previously. These nodes include two CECs (designated as CEC-0 and CEC-1), two RPCs (designated as RPC-0 and RPC-1), and two PPSs (designated as PPS-0 and PPS-1). As the graphical representation indicates, each of the nodes is interconnected by a series of power cables. In the depicted representation, each arrow represents one direction of a full-duplex cable.

FIG. 4A indicates the initialization step, where each adapter (node) is assigned an arbitrary value of ten (10), and each of the cables is also assigned a weighting value of one (1) for each direction. As will be seen throughout FIGS. 4A-4H and FIGS. 5A-5D, following, power cables that are exhibiting deficiencies (failing, for example), are designated by a dashed line as opposed to a solid arrow.

Continuing the example in FIG. 4A, the list of adapters is iterated and each adapter cable is analyzed for communication errors. If communication between CEC-0 and RPC-0 (from CEC-0 to RPC-0 as indicated by the dashed line) is determined to be faulty, RPC-0 is decremented by the weighting value (10−1=9) and the weighting value for the cable is incremented (1+1=2).

Turning to FIG. 4B, a second step in the exemplary single-point cable failure is depicted. Further analysis of the graph credits CEC-0 for successful communication from RPC-1, so the net value for CEC-0 remains 10.

FIG. 4C illustrates a third step in the cable failure example, indicating that communication has been determined to be faulty in both directions between CEC-0 and RPC-0. As a result, the weighting value in both directions is incremented to 2. As in the previous step, however, because RPC-0 is credited for successful communication from all other adapters, its value is incremented and cannot exceed 10.

Figure 4F:
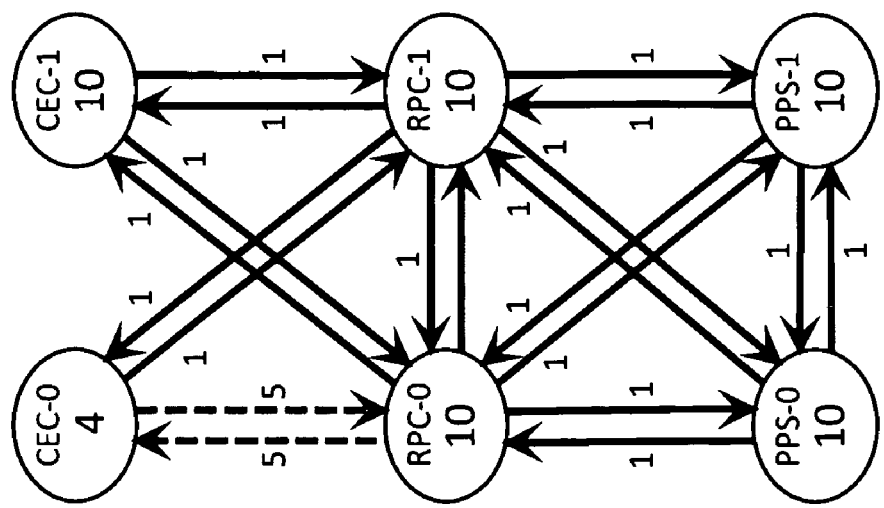
FIG. 4F illustrates a sixth step in the exemplary single-point power cable failure between adapters shown in FIG. 4A.
Figure 4E:
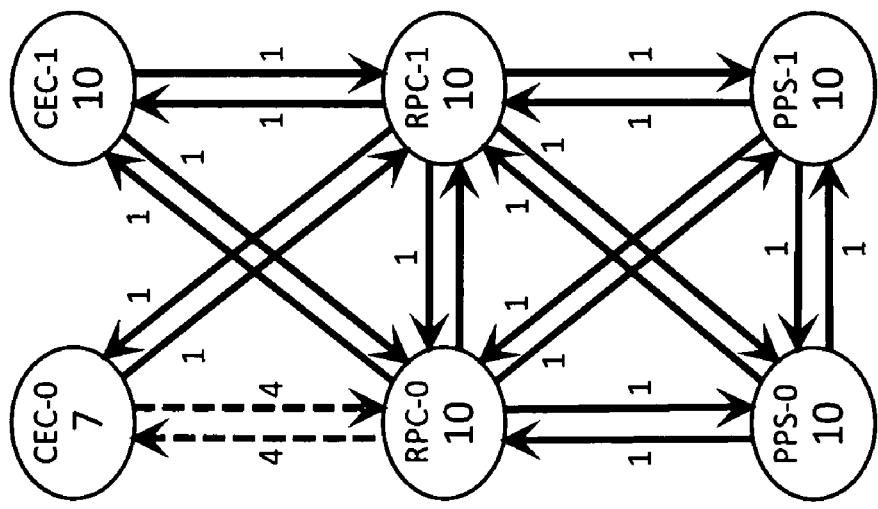
FIG. 4E illustrates a fifth step in the exemplary single-point power cable failure between adapters shown in FIG. 4A.
Figure 4D:
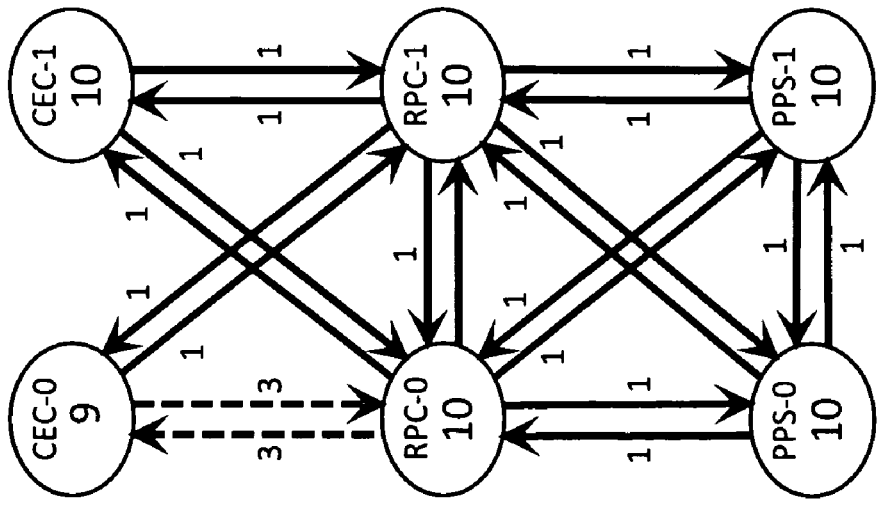
FIG. 4D illustrates a fourth step in the exemplary single-point power cable failure between adapters shown in FIG. 4A.

FIG. 4D illustrates a fourth step in the cable failure example, indicating the results of repeating steps two and three (FIGS. 4B and 4C). At this point, the cable weighting values have been incremented to 3, and the adjusted value for CEC-0 is 9 (10−2+1=9). As in step three, RPC-0 cannot exceed a value of 10.

FIG. 4E illustrates a fifth step in the cable failure example, indicating the results of again repeating steps two and three (again, FIGS. 4B and 4C). At this point, the cable weighting values have been incremented to 4, and the adjusted value for CEC-0 is 7 (9−3+1=7). As in step four previously, RPC-0 cannot exceed a value of 10.

FIG. 4F illustrates a sixth step in the cable failure example, indicating the results of once again repeating steps two and three (again, FIGS. 4B and 4C). The net value for CEC-0 reaches 4 (7−4+1=4), and RPC-0 continues to hold a maximum value of 10. A threshold (greater than or equal to 5) is reached for the weighting value of the cable. The adjusted value for CEC-0 (the first adapter) is less than the second adapter (RPC-0), so a recovery is performed on CEC-0.

Figure 4H:
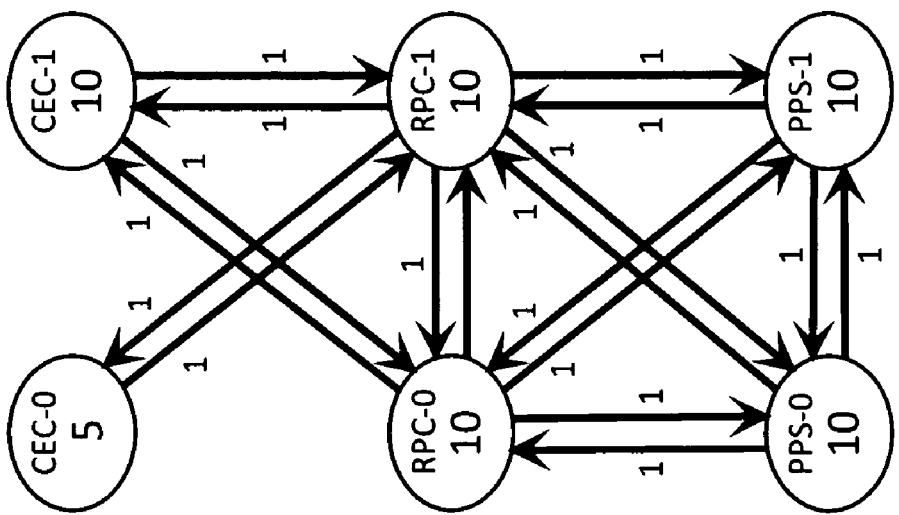
FIG. 4H illustrates an eighth step in the exemplary single-point power cable failure between adapters shown in FIG. 4A.
Figure 4G:
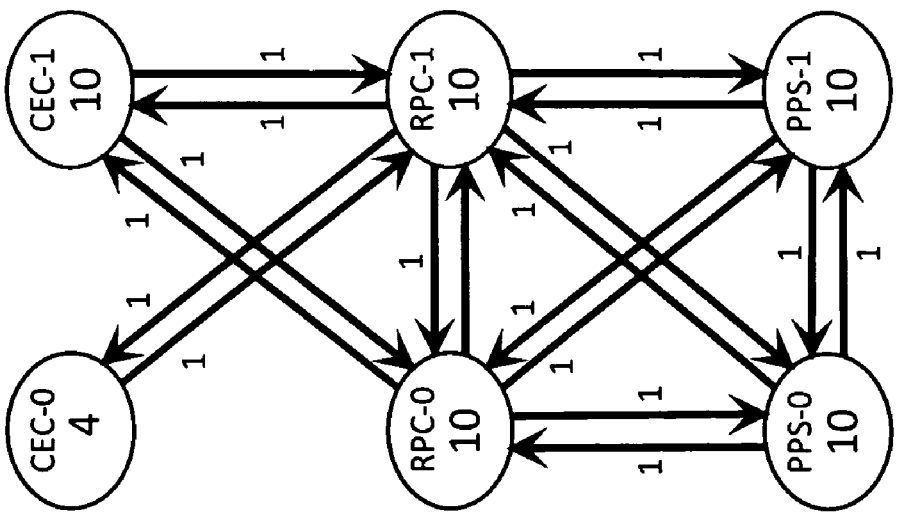
FIG. 4G illustrates a seventh step in the exemplary single-point power cable failure between adapters shown in FIG. 4A.

FIG. 4G illustrates a seventh step in the cable failure example, depicting the result of executing the recovery on CEC-0. Further analysis reveals minimal resistance (weighting value) on additional cables connecting CEC-0 with the remainder of the power network. As a result, the cable incident to CEC-0 and RPC-0 is faulted and removed from the graph.

FIG. 4H illustrates an eighth step in the cable failure example, depicting continuation of the analysis according to method 100 (FIG. 3). Further analysis credits the value of CEC-0 for successful communication to other adapters. In a short time (following additional iterations), the value of CEC-0 will again reach a maximum value of 10.

Figure 5A:
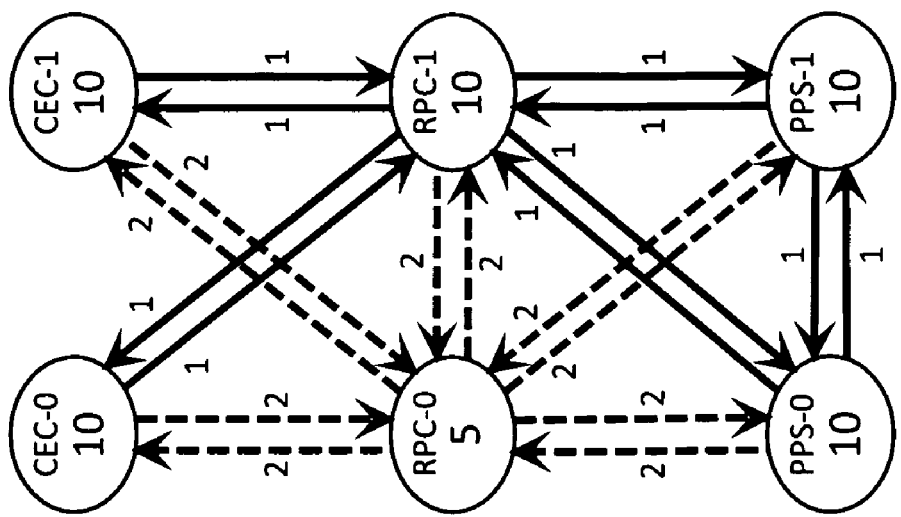
FIG. 5A illustrates a first iteration in an exemplary adapter failure.
Figure 5D:
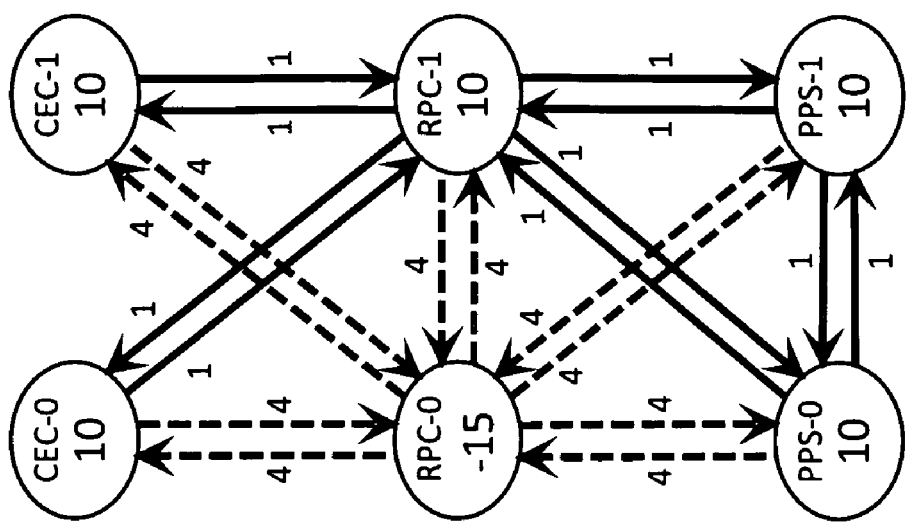
FIG. 5D illustrates a seventh step in the exemplary adapter failure shown in FIG. 5A.
Figure 5C:
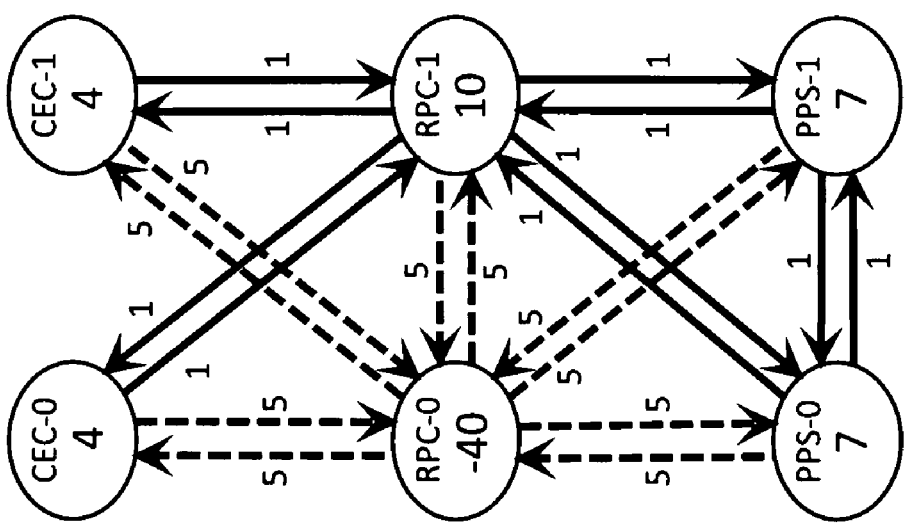
FIG. 5C illustrates up to a sixth step in the exemplary adapter failure shown in FIG. 5A.
Figure 5B:
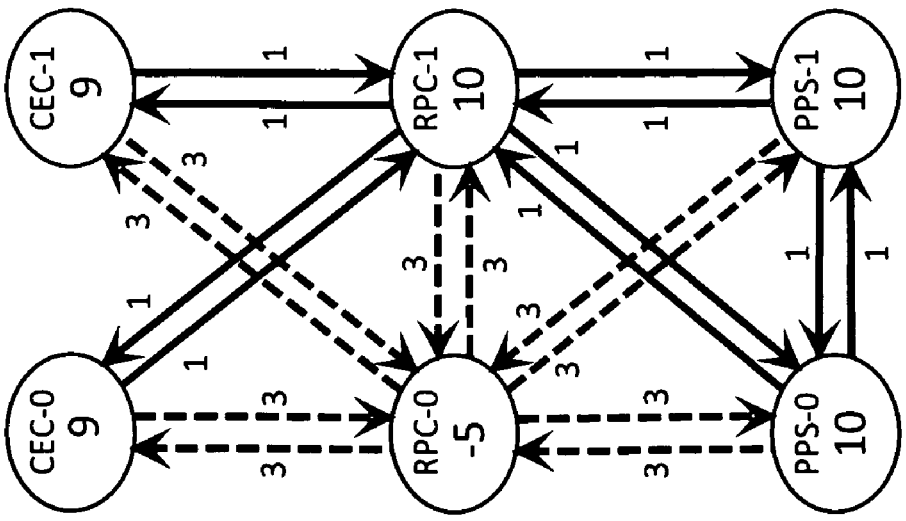
FIG. 5B illustrates a second iteration in the exemplary adapter failure shown in FIG. 5A.

FIG. 5A illustrates a first iteration in an additional communication failure example is illustrated where method 100 (FIG. 3) is applied. In the present example, no communication is obtained from/to RPC-0. As in the single-point cable failure example, as a first step, each of the network paths/adapters is examined. A first iteration of all of the edges of the graph reveals the following (as depicted, with weighting values incremented as depicted):

$CEC\text{-}0 = CEC\text{-}1 = 10 - 1 + 1 = 10$ $RPC\text{-}0 = 10 - 5 = 5$ $RPC\text{-}1 = 10 - 1 + 4 > 10$ $PPS\text{-}0 = PPS\text{-}1 = 10 - 1 + 2 > 10$ FIG. 5B illustrates a second iteration of the example failure shown in FIG. 5A. The second iteration of the cables reveals the following (again as depicted, and again with weighting values incremented as depicted):

$CEC\text{-}0 = CEC\text{-}1 = 10 - 2 + 1 = 9$ $RPC\text{-}0 = 5 - 10 = -5$ $RPC\text{-}1 = 10 - 2 + 4 > 10$ $PPS\text{-}0 = PPS\text{-}1 = 10 - 2 + 2 = 10$ FIG. 5C illustrates the continuation of application of method 100 (FIG. 3) to the graph. Regardless of which cable reaches a threshold first, examination of the cable's incident adapters reveal that RPC-0 has the lowest adjusted value (here depicted as −40). An RPC-0 recovery is then popped off the recovery stack and executed. Further single-point analysis reveals that the error is not isolated to a single cable.

Turning to FIG. 5D, a possible seventh step in the example failure is shown, illustrating an architectural decision to perform a power cycle recovery as the first recovery performed on RPC-0. If this recovery is successful, the graph temporarily changes as RPC-0 and all cables incident to RPC-0 are temporarily removed from the graph as power is reset. Upon the reset of the adapter, the RPC-0 and incident cables are reinserted. The iteration following the recovery reveals the following (again as adapter adjusted values and weighting values are depicted):

$CEC\text{-}0 = CEC\text{-}1 = 4 + 5 + 1 = 10$ $RPC\text{-}0 = -40 + 5*5 = -15$ $RPC\text{-}1 > 10$ $PPS\text{-}0 = PPS\text{-}1 = 7 + 5 + 2 > 10$ FIG. 5D illustrates a low-tolerance implementation of a recovery, where upon completion of the recovery, all cable weighting values persist. A high-tolerance recovery may reset the cables' weighting values to 0, giving the power network time for the recovery action to respond. In such a case, each successive iteration, post-recovery, would increase RPC-0's adjusted value by 5, and take 10 full iterations to restore RPC-0's adjusted value to the maximum value (−40+10*5=10). It follows that the power network would take 5 post-recovery iterations to detect that the recovery failed, and then institute another recovery at the top of the recovery stack.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Various types of processors may also implement modules. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for determining severity of communication deficiencies, isolating faults, and mapped recovery in a power network of a data processing environment by a processor device connected to a memory device, comprising:

pursuant to a continuous graph theory analysis:

initializing each of a plurality of nodes of the power network with an equal, arbitrary value; and analyzing each of a plurality of network paths connecting each of the plurality of nodes, wherein:

upon a successful communication over one of the plurality of network paths, incrementing one arbitrary value of one of the plurality of nodes connected to the one of the plurality of network paths by a weighting value of a plurality of weighting values, the weighting value representative of a physical characteristic of the one of the plurality of network paths, upon a communication deficiency over the one of the plurality of network paths, decrementing the one arbitrary value of the one of the plurality of nodes connected to the one of the plurality of network paths by the weighting value, repeating at least one of the incrementing and decrementing on an adjusted value for the one of the plurality of nodes obtained from application of the weighting value until a predetermined threshold for the one of the plurality of network paths is reached, and upon reaching the predetermined threshold, performing a recovery on which of the plurality of nodes connected to the one of the plurality of network paths having a lower adjusted value.

2. The method of claim 1, wherein:

the incrementing the one arbitrary value of one of the plurality of nodes connected to the one of the plurality of network paths by the weighting value of the plurality of weighting values is performed up to a maximum value, and the performing the recovery on the which of the plurality of nodes connected to the one of the plurality of network paths having the lower adjusted value is executed in priority according to a recovery stack.

3. The method of claim 1, wherein the incrementing the one arbitrary value of one of the plurality of nodes connected to the one of the plurality of network paths by the weighting value includes decrementing the weighting value.

4. The method of claim 3, wherein the decrementing the one arbitrary value of the one of the plurality of nodes connected to the one of the plurality of network paths by the weighting value includes incrementing the weighting value.

5. The method of claim 4, wherein the repeating the at least one of the incrementing and decrementing on the adjusted value includes repeating at least one of the decrementing and incrementing the weighting value.

6. The method of claim 1, further including, upon reaching the predetermined threshold and determining two of the plurality of nodes connected to the one of the plurality of network paths having an equal adjusted value, performing a recovery on the one of the plurality of network paths.

7. A system for determining severity of communication deficiencies, isolating faults, and mapped recovery in a power network of a data processing environment, comprising:

a power processor device connected to a memory device, the power processor device adapted for, pursuant to continuous graph theory analysis:

initializing each of a plurality of nodes of the power network with an equal, arbitrary value, and analyzing each of a plurality of network paths connecting each of the plurality of nodes, wherein:

upon a successful communication over one of the plurality of network paths, one arbitrary value of one of the plurality of nodes connected to the one of the plurality of network paths is incremented by a weighting value of a plurality of weighting values, the weighting value representative of a physical characteristic of the one of the plurality of network paths, upon a communication deficiency over the one of the plurality of network paths, the one arbitrary value of the one of the plurality of nodes connected to the one of the plurality of network paths is decremented by the weighting value, at least one of the incrementing and decrementing on an adjusted value is repeated for the one of the plurality of nodes obtained from application of the weighting value until a predetermined threshold for the one of the plurality of network paths is reached, and upon reaching the predetermined threshold, a recovery is performed on which of the plurality of nodes connected to the one of the plurality of network paths has a lower adjusted value.

8. The system of claim 7, wherein the power processor device is further adapted for incrementing the one arbitrary value of one of the plurality of nodes connected to the one of the plurality of network paths by the weighting value of the plurality of weighting values up to a maximum value, and executing performing the recovery on the which of the plurality of nodes connected to the one of the plurality of network paths having the lower adjusted value in priority according to a recovery stack.

9. The system of claim 7, wherein the power processor device is further adapted for, subsequent to incrementing the one arbitrary value of one of the plurality of nodes connected to the one of the plurality of network paths by the weighting value, decrementing the weighting value.

10. The system of claim 9, wherein the power processor device is further adapted for, subsequent to decrementing the one arbitrary value of the one of the plurality of nodes connected to the one of the plurality of network paths by the weighting value, incrementing the weighting value.

11. The system of claim 10, wherein the power processor device is further adapted for, pursuant to repeating the at least one of the incrementing and decrementing on the adjusted value, repeating at least one of the decrementing and incrementing the weighting value.

12. The system of claim 7, wherein the power processor device is further adapted for, upon reaching the predetermined threshold and determining two of the plurality of nodes connected to the one of the plurality of network paths having an equal adjusted value, performing a recovery on the one of the plurality of network paths.

13. The system of claim 7, wherein the physical characteristic of the one of the plurality of network paths comprises one of a resistance and a friction.

14. The system of claim 7, wherein the one of the plurality of nodes comprises a power adapter device, and the one of the plurality of network paths comprises a power cable incident to the power adapter device.

15. A computer program product for determining severity of communication deficiencies, isolating faults, and mapped recovery in a power network of a data processing environment by a processor device connected to a memory device, the computer program product comprising a computer-readable storage medium having computer-readable program code portions stored therein, the computer-readable program code portions comprising:

a first executable portion for, pursuant to a continuous graph theory analysis, initializing each of a plurality of nodes of the power network with an equal, arbitrary value; and a second executable portion for analyzing each of a plurality of network paths connecting each of the plurality of nodes according to the continuous graph theory analysis, wherein:

upon a successful communication over one of the plurality of network paths, one arbitrary value of one of the plurality of nodes connected to the one of the plurality of network paths is incremented by a weighting value of a plurality of weighting values, the weighting value representative of a physical characteristic of the one of the plurality of network paths, upon a communication deficiency over the one of the plurality of network paths, the one arbitrary value of the one of the plurality of nodes connected to the one of the plurality of network paths is decremented by the weighting value, at least one of the incrementing and decrementing on an adjusted value is repeated for the one of the plurality of nodes obtained from application of the weighting value until a predetermined threshold for the one of the plurality of network paths is reached, and upon reaching the predetermined threshold, a recovery is performed on which of the plurality of nodes connected to the one of the plurality of network paths has a lower adjusted value.

16. The computer program product of claim 15, further including:

a third executable portion for incrementing the one arbitrary value of one of the plurality of nodes connected to the one of the plurality of network paths by the weighting value of the plurality of weighting values up to a maximum value, and a fourth executable portion for executing performing the recovery on the which of the plurality of nodes connected to the one of the plurality of network paths having the lower adjusted value in priority according to a recovery stack.

17. The computer program product of claim 15, further including a third executable portion for, subsequent to incrementing the one arbitrary value of one of the plurality of nodes connected to the one of the plurality of network paths by the weighting value, decrementing the weighting value.

18. The computer program product of claim 17, further including a fourth executable portion for, subsequent to decrementing the one arbitrary value of the one of the plurality of nodes connected to the one of the plurality of network paths by the weighting value, incrementing the weighting value.

19. The computer program product of claim 18, further including a fifth executable portion for, pursuant to repeating the at least one of the incrementing and decrementing on the adjusted value, repeating at least one of the decrementing and incrementing the weighting value.

20. The computer program product of claim 15, further including a third executable portion for, upon reaching the predetermined threshold and determining two of the plurality of nodes connected to the one of the plurality of network paths having an equal adjusted value, performing a recovery on the one of the plurality of network paths.

* * * * *